(12) United States Patent
Po-Jung et al.

(10) Patent No.: US 8,417,065 B2
(45) Date of Patent: Apr. 9, 2013

(54) IMAGE PROCESSING SYSTEM AND METHOD

(75) Inventors: Lin Po-Jung, Kaohsiung (TW); Chen Shuei-Lin, Kaohsiung (TW)

(73) Assignee: Altek Corporation, Science Park, Hsinchu (TW)

( * ) Notice: Subject to any disclaimer, the term of this patent is extended or adjusted under 35 U.S.C. 154(b) by 0 days.

(21) Appl. No.: 13/278,185

(22) Filed: Oct. 21, 2011

(65) Prior Publication Data

US 2012/0038791 A1 Feb. 16, 2012

Related U.S. Application Data

(62) Division of application No. 12/314,541, filed on Dec. 12, 2008, now Pat. No. 8,086,074.

(30) Foreign Application Priority Data

Dec. 13, 2007 (TW) ................. 96147750 A

(51) Int. Cl.
*G06K 9/32* (2006.01)
(52) U.S. Cl. ......... 382/298; 382/232; 382/100; 382/274

(58) Field of Classification Search ............... 382/100, 382/232, 298, 299, 274; 348/231.2, 561, 348/581, 582, 204; 708/208; 358/450
See application file for complete search history.

(56) References Cited

U.S. PATENT DOCUMENTS

| 6,041,143 A * | 3/2000 | Chui et al. ................ 382/232 |
| 2002/0093518 A1 * | 7/2002 | Nakano .................... 345/643 |
| 2005/0276481 A1 * | 12/2005 | Enomoto .................. 382/190 |
| 2006/0171595 A1 * | 8/2006 | Hasegawa et al. ........... 382/224 |

* cited by examiner

*Primary Examiner* — Ali Bayat
(74) *Attorney, Agent, or Firm* — Winston Hsu; Scott Margo

(57) ABSTRACT

This invention relates to an image processing system and method, the image processing system comprising an image capturing unit; a resolution conversion unit; a detection unit; an image conversion processing unit; an image compression unit, and a memory unit, the processing method comprising the steps of: capturing a first image data; transferring the first image data to the resolution conversion unit and the image conversion processing unit; converting the first image data into a second image data; detecting a plurality of position data from the second image data according to at least one detection rule; generating a third image data by mapping the first image data according to a mapping table; and compressing the third image data. This invention has image encryption function.

6 Claims, 4 Drawing Sheets

IMAGE PROCESSING SYSTEM AND METHOD

CROSS REFERENCE TO RELATED APPLICATIONS

This is a divisional application of Ser. No. 12/314,541, now pending, filed on Dec. 12, 2008.

BACKGROUND OF THE INVENTION

1. Field of the Invention

This invention relates to image processing systems and methods, and more particularly, to image processing systems and methods that have image encryption function.

2. Description of the Prior Art

Since handheld devices with digital camera function are widely used, the image data security is getting more and more important. Private images may be disclosed when the handheld device is lost, stolen, repaired, or borrowed. The existing image data encryption technique usually needs a computer to add some identification codes in the header of JPEG image through software, for example. This method is not secure enough. Confidential or private images may be disclosed due to man-made mistakes or device lost. Further, the existing methods have the following defects: (1) the way to encrypt the JPEG headers may cause the whole image cannot be opened; (2) the image cannot be blurred; (3) the captured images cannot be encrypted instantly.

SUMMARY OF THE INVENTION

The objective of the present invention is to provide a novel image processing system and method which have image encryption function.

In accordance with one aspect of the invention there is provided an image processing system which includes an image capturing unit for capturing a first image data, the first image data having a plurality of pixels, each pixel corresponding to one position datum; a first storage unit for storing the first image data; a resolution conversion unit for converting the first image data into a second image data; a second storage unit for storing at least one detection rule; a detection unit for detecting a plurality of position data from the second image data according to the detection rule; a third storage unit for storing the plurality of position data; a direct memory access control unit for accessing the first storage unit and the third storage unit; a first processing unit for generating a mapping table, according to a predefined encryption rule, by accessing the first storage unit and the third storage unit through the direct memory access control unit, the mapping table recording the mapped positions of at least a portion of pixels; a fourth storage unit for storing the mapping table, the direct memory access control unit further accessing the fourth storage unit; a second processing unit for generating a third image data by accessing the first storage unit and the fourth storage unit through the direct memory access control unit; and a fifth storage unit for storing the third image data. In an exemplary embodiment, the image processing system further includes a position selection unit for visually selecting a plurality of positions by a user after the detection unit detecting a plurality of position data. In another exemplary embodiment, the image processing system further includes an image compression unit for compressing the third image data. In another exemplary embodiment, resolution of the second image data is less than resolution of the first image data. In another exemplary embodiment, the mapping table records mapped positions of all pixels. In another exemplary embodiment, the detection rule is set in advance or is manually set by a user.

In accordance with another aspect of the invention there is provided an image processing method for an image processing system, the image processing system includes an image capturing unit; a first storage unit for storing the first image data; a resolution conversion unit; a second storage unit for storing at least one detection rule; a detection unit; a third storage unit for storing the plurality of position data; a direct memory access control unit; a first processing unit; a fourth storage unit for storing a mapping table; a second processing unit; and a fifth storage unit for storing the third image data. The image processing method includes the steps of: capturing a first image data, storing the first image data into the first storage unit, and transferring the first image data to the resolution conversion unit; converting the first image data into a second image data, and transferring the second image data to the detection unit; detecting a plurality of position data from the second image data according to at least one detection rule, and storing the position data to the third storage unit; accessing the first storage unit and the third storage unit, generating a mapping table by a predefined encryption rule, and storing the mapping table into the fourth storage unit; accessing the first storage unit and the fourth storage unit; generating a third image data; and storing the third image data into the fifth storage unit. In an exemplary embodiment, the image processing system includes a position selection unit, and the image processing method further includes the step of: visually selecting a plurality of positions by a user and storing the position data into the third storage unit. In another exemplary embodiment, the image processing system further includes an image compression unit, after the step of generating a third image data, the image processing method further includes the step of: compressing the third image data. In another exemplary embodiment, resolution of the second image data is less than resolution of the first image data. In another exemplary embodiment, the mapping table records mapped positions of all pixels. In another exemplary embodiment, the detection rule is set in advance or is manually set by a user.

In accordance with another aspect of the invention there is provided an image processing system which includes an image capturing unit for capturing a first image data, the first image data having a plurality of pixels, each pixel corresponding to one position datum; a resolution conversion unit for converting the first image data into a second image data; a detection unit for detecting a plurality of position data from the second image data according to at least one detection rule, a plurality of detection rules being provided in the detection unit; an image conversion processing unit for converting the first image data into a third image data according to the position data and a mapping table, the mapping table recording the mapped positions of at least a portion of pixels; an image compression unit for compressing the third image data; and a memory unit for storing the first image data, the detection rule, the position data, the mapping table, and the third image data. In an exemplary embodiment, the detection unit further includes a position selection module for visually selecting a plurality of positions by a user after the detection unit detecting a plurality of position data. In another exemplary embodiment, resolution of the second image data is less than resolution of the first image data. In another exemplary embodiment, the mapping table records mapped positions of all pixels. In another exemplary embodiment, the detection rule is set in advance or is manually set by a user.

In accordance with another aspect of the invention there is provided an image processing method for an image processing system, the image processing system includes an image capturing unit; a resolution conversion unit; a detection unit; an image conversion processing unit; an image compression unit; and a memory unit. The image processing method includes the steps of: capturing a first image data; transferring the first image data to the resolution conversion unit and the image conversion processing unit; converting the first image data into a second image data; detecting a plurality of position data from the second image data according to at least one detection rule; generating a third image data by mapping the first image data according to a mapping table; and compressing the third image data. In an exemplary embodiment, the detection unit further includes a position selection module, after the step of detecting a plurality of position data from the second image data according to at least one detection rule, the image processing method further includes the step of: visually selecting a plurality of positions by a user. In another exemplary embodiment, resolution of the second image data is less than resolution of the first image data. In another exemplary embodiment, the mapping table records mapped positions of all pixels. In another exemplary embodiment, the detection rule is set in advance or is manually set by a user.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The foregoing and advantages of the invention will be appreciated more fully from the following further description thereof with reference to the accompanying drawings wherein.

DETAILED DESCRIPTION

The following exemplary examples will be described in detail with the appended drawings in order to make the aforementioned objectives, functional features, and advantages more clearly understood.

Figure 1:
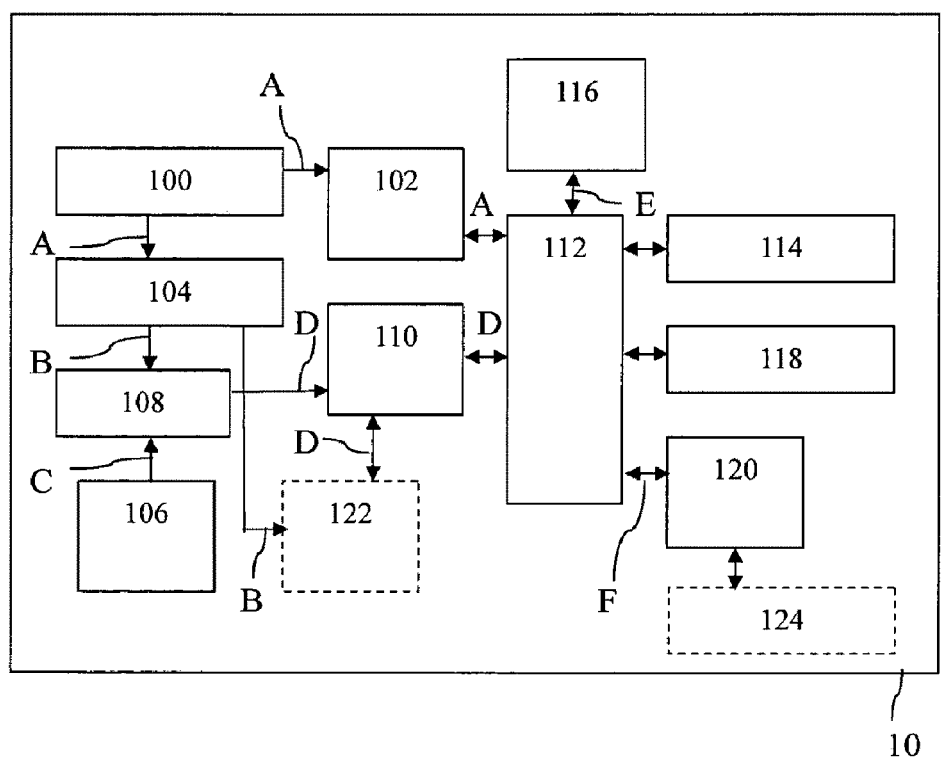
FIG. 1 shows an image processing system according to a preferred embodiment of the present invention.

FIG. 1 shows an image processing system 10 according to a preferred embodiment of the present invention. The image processing system 10 includes an image capturing unit 100, a first storage unit 102, a resolution conversion unit 104, a second storage unit 106, a detection unit 108, a third storage unit 110, a direct memory access (DMA) control unit 112, a first processing unit 114, a fourth storage unit 116, a second processing unit 118, and a fifth storage unit 120. The image capturing unit 100 is used for capturing a first image data. The first image data have a plurality of pixels, and each pixel corresponds to one position datum. The image capturing unit 100 may be a charge coupled device (CCD), complementary metal-oxide semiconductor (CMOS), and so on. The first storage unit 102 is used for storing the first image data A. The resolution conversion unit 104 is used for converting the first image data A into a second image data B. In an exemplary embodiment, resolution of the second image data B is less than resolution of the first image data A. For example, the resolution conversion unit 104 is used for converting the first image data A having higher resolution (such as 1024*768) into a second image data B having lower resolution (such as 640*480). The second storage unit 106 is used for storing at least one detection rule C. For example, the detection rule C may be: a portion of the image data has a human face feature. Since face recognition technique is well known in the art, the detailed description is omitted. The detection unit 108 is used for detecting a plurality of position data D from the second image data B according to the detection rule C (for example, having a human face feature), such as detecting all position data of the pixels corresponding to the human face. In another exemplary embodiment, the detection rule C is set in advance or is manually set by a user. The third storage unit 110 is used for storing the plurality of position data D outputted by the detection unit 108. The first processing unit 114 is used for generating a mapping table E, according to a predefined encryption rule, by accessing the first image data A in the first storage unit 102 and the position data D in the third storage unit 110 through the DMA control unit 112. The mapping table E records the mapped positions of at least a portion of pixels. In another exemplary embodiment, the mapping table E records mapped positions of all pixels. It should be noticed that since the position data D is obtained based on the second image data B, the first processing unit 114 needs to perform one mapping for the position data D to obtain the mapped position data D that is based on the first image data A. Further, since resolution of the first image data A and the second image data B is known, the mapping can be performed according to a simple ratio rule. The predefined encryption rule may be mosaic (unclear but still can be recognized), random (cannot be recognized), and so on. For example, the encryption rule of mosaic is to make all pixels adjacent to a pixel which is going to be encrypted have the same grey-level value of the pixel. In another exemplary embodiment, the encryption rule of mosaic is to make all pixels in a predefined range (such as 3*3) have same grey-level value which is calculated by averaging the grey-level values of the nine pixels. For example, the encryption rule of random is to randomize the grey-level values of the pixels that are going to be encrypted. According to the above process, a mapping table E is generated. The mapping table E records the mapped positions of pixels that are going to be encrypted. The fourth storage unit 116 is used for storing the mapping table E. The second processing unit 118 is used for generating a third image data F by accessing the first image data A in the first storage unit 102 and the mapping table in the fourth storage unit 116 through the DMA control unit 102. The fifth storage unit 120 is used for storing the third image data F.

In an exemplary embodiment, the image processing system 10 further includes a position selection unit 122 for visually selecting a plurality of positions by a user after the detection unit 108 detecting a plurality of position data D. In particularly, the position selection unit 122 may be a touch panel. The touch panel displays the second image data B and the plurality of position data D detected by the detection unit 108 simultaneously. If the user thinks that the plurality of position data D are not proper position data or are incorrect, he/she can directly select the positions (that is, pixels) that are going to be encrypted by operating on the touch panel. In this manner, the detected positions can be further adjusted. In another exemplary embodiment, the image processing system 10 further includes an image compression unit 124 for compressing the third image data F. The compressed third image data is stored in the fifth storage unit 120.

The first storage unit 102, the second storage unit 106, the third storage unit 110, the fourth storage unit 116, the fifth storage unit 120 can be static random access memory (SRAM), dynamic random access memory (DRAM), synchronous dynamic random access memory (SDRAM), read only memory (ROM), programmable read only memory (PROM), erasable programmable read only memory (EPROM), one time programmable read only memory (OTPROM), electrically erasable programmable read only memory (EEPROM), Flash memory, and so on.

Figure 2:
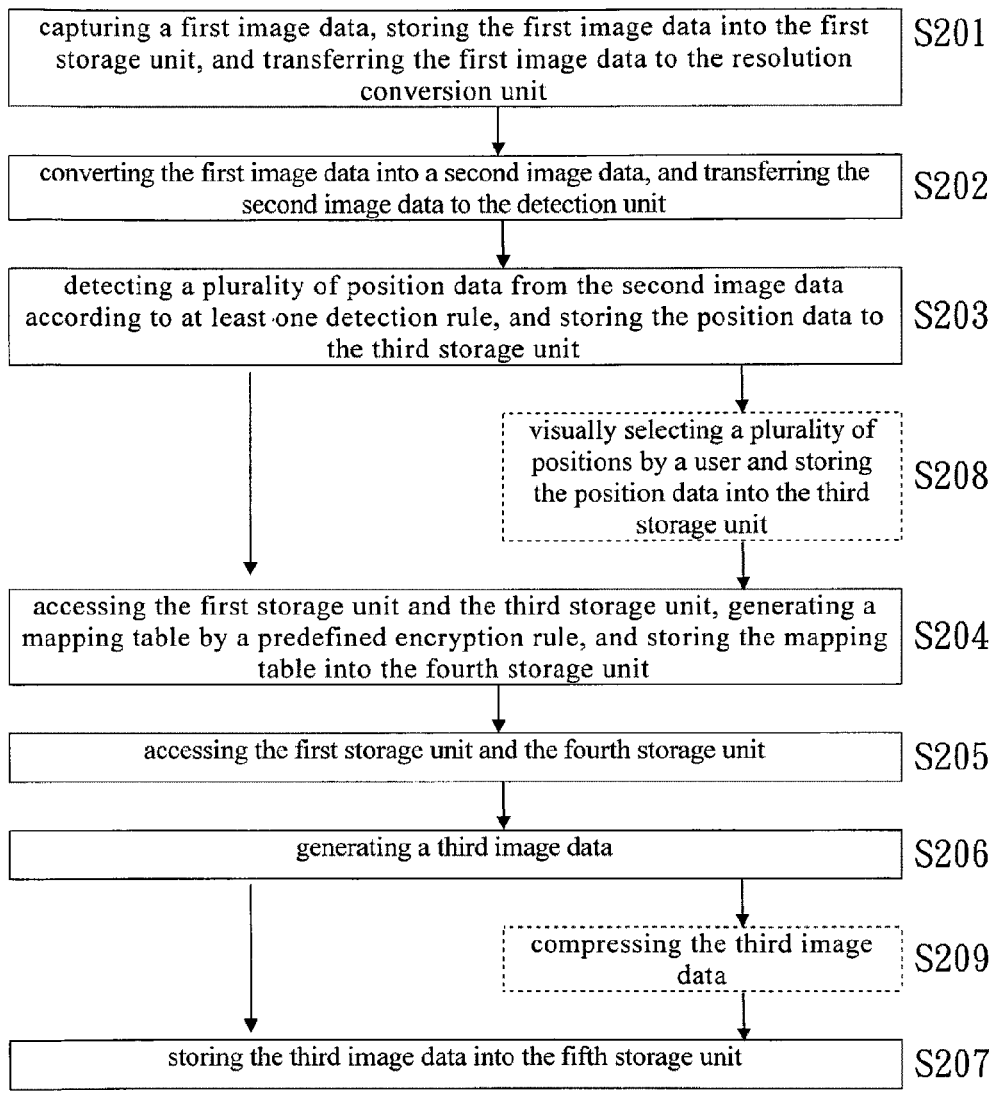
FIG. 2 shows a flow chart of an image processing method of the image processing system according to a preferred embodiment of the present invention.

FIG. 2 shows a flow chart of an image processing method of the image processing system 10 according to a preferred embodiment of the present invention. In step S201, the image capturing unit 100 captures a first image data, stores the first image data into the first storage unit 102, and transfers the first image data A to the resolution conversion unit 104. In step S202, the resolution conversion unit 104 converts the first image data A into a second image data B, and transfers the second image data B to the detection unit 108. In another exemplary embodiment, resolution of the second image data B is less than resolution of the first image data A. For example, the resolution conversion unit 104 converts the first image data A having higher resolution (such as 1024*768) into a second image data B having lower resolution (such as 640*480). In step S203, the detection unit 108 detects a plurality of position data D from the second image data B according to at least one detection rule C, and stores the position data D to the third storage unit 110. For example, the detection rule C may be: a portion of the image data has a human face feature. Since face recognition technique is well known in the art, the detailed description is omitted. The detection unit 108 detects a plurality of position data from the second image data B according to the detection rule C (for example, having a human face feature), such as detecting all position data of the pixels corresponding to the human face. In another exemplary embodiment, the detection rule C is set in advance or is manually set by a user. In step S204, the first processing unit 114 accesses the first image data A in the first storage unit 102 and the position data D in the third storage unit 110 (since the position data D is obtained based on the second image data B, the first processing unit 114 needs to perform one mapping for the position data D to obtain the mapped position data D that is based on the first image data A), and generates a mapping table E by a predefined encryption rule (the mapping table E records the mapped positions of at least a portion of pixels). The mapping table E is stored in the fourth storage unit 116. In an exemplary embodiment, the mapping table E records mapped positions of all pixels. It should be noticed that since the position data D is obtained based on the second image data B, the first processing unit 114 needs to perform one mapping for the position data D to obtain the mapped position data D that is based on the first image data A. Further, since resolution of the first image data A and the second image data B is known, the mapping can be performed according to a simple ratio rule. The predefined encryption rule may be mosaic (unclear but still can be recognized), random (cannot be recognized), and so on. According to the above process, a mapping table E is generated. The mapping table E records the mapped positions of pixels that are going to be encrypted. In step S205, the second processing unit 118 accesses the first image data A in the first storage unit 102 and the mapping table E in the fourth storage unit 116 through the DMA control unit 112. In step S206, a third image data F is generated by the mapping. In step S207, the third image data F is stored in the fifth storage unit 120.

In an exemplary embodiment, the image processing system 10 further includes a position selection unit 122. Between steps S203 and S204, the image processing method further includes the step of: visually selects a plurality of positions by a user and stores the position data D into the third storage unit 110 (step S208). In particularly, the position selection unit 122 may be a touch panel. The touch panel displays the second image data B and the plurality of position data D detected by the detection unit 108 simultaneously. If the user thinks that the plurality of position data D are not proper position data or are incorrect, he/she can directly select the positions (that is, pixels) that are going to be encrypted by operating on the touch panel. In this manner, the detected positions can be further adjusted. In another exemplary embodiment, the image processing system 10 further includes an image compression unit 124 for compressing the third image data F. Between steps S206 and S207, the image processing method further includes the step of: compresses the third image data F (step S209). In an exemplary embodiment, the compressed third image data is stored in the fifth storage unit 120.

Figure 3:
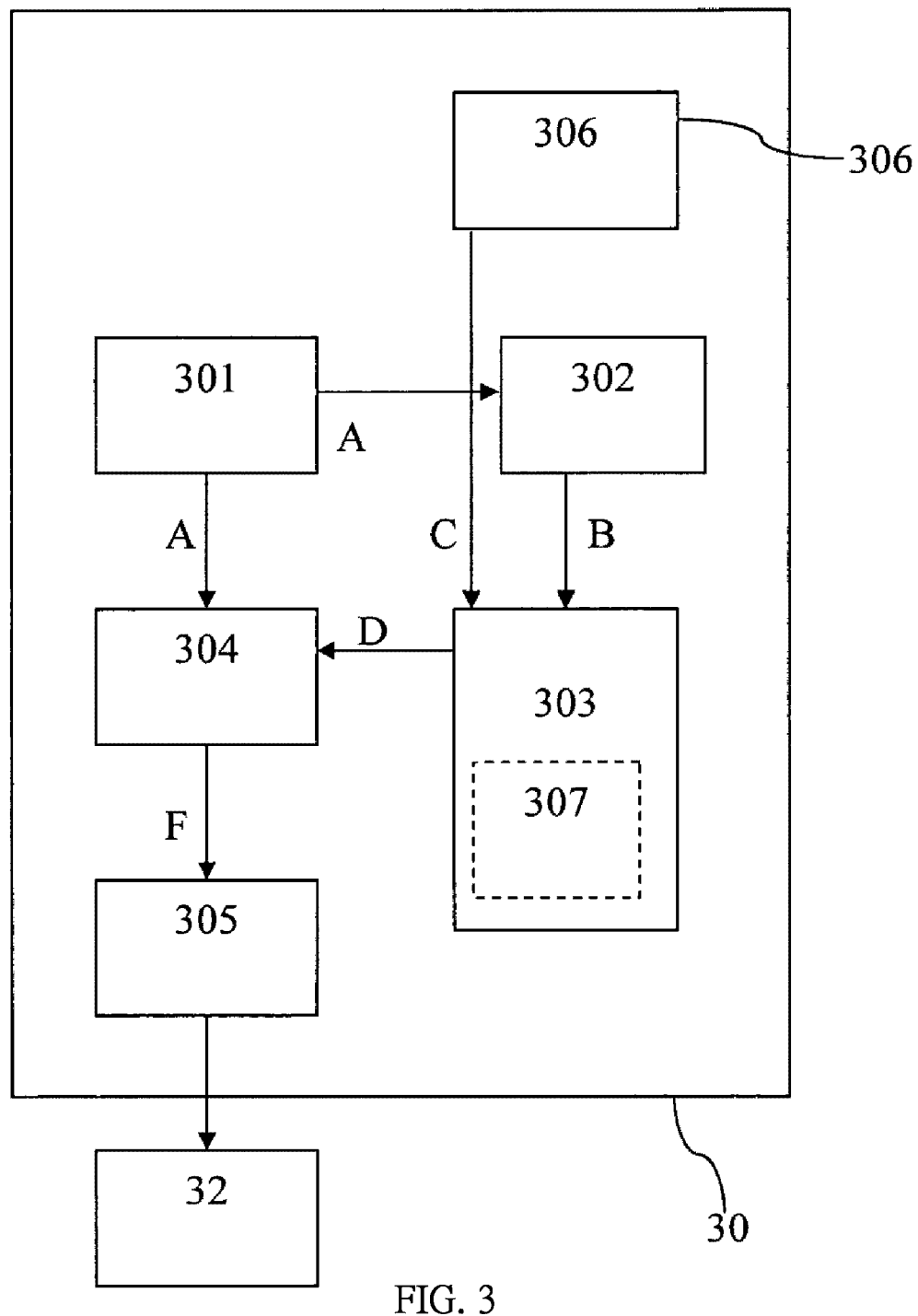
FIG. 3 shows an image processing system according to another preferred embodiment of the present invention.

FIG. 3 shows an image processing system 30 according to another preferred embodiment of the present invention. The image processing system 30 includes an image capturing unit 301, a resolution conversion unit 302, a detection unit 303, an image conversion processing unit 304, an image compression unit 305, and a memory unit 306. The image capturing unit 301 is used for capturing a first image data. The first image data have a plurality of pixels, and each pixel corresponds to one position datum. The image capturing unit 301 may be a charge coupled device (CCD), complementary metal-oxide semiconductor (CMOS), and so on. The first image data A is transferred to the resolution conversion unit 302 and the image conversion processing unit 304. Persons with ordinary skill in the art readily understand that the first image data A may be stored in the memory unit 306. The resolution conversion unit 302 is used for converting the first image data A into a second image data B. In an exemplary embodiment, resolution of the second image data B is less than resolution of the first image data A. For example, the resolution conversion unit 302 converts the first image data A having higher resolution (such as 1024*768) into a second image data B having lower resolution (such as 640*480). The detection unit 303 is used for detecting a plurality of position data D from the second image data B according to at least one detection rule C. The detection rule C is stored in the memory unit 306. For example, the detection rule C may be: a portion of the image data has a human face feature. Since face recognition technique is well known in the art, the detailed description is omitted. The detection unit 303 is used for detecting a plurality of position data D from the second image data B according to the detection rule C (for example, having a human face feature), such as detecting all position data of the pixels corresponding to the human face. In another exemplary embodiment, the detection rule C is set in advance or is manually set by a user. The image conversion processing unit 304 is used for generating a mapping table, according to the first image data A and the plurality of position data D, through a predefined encryption rule. The mapping table records the mapped positions of at least a portion of pixels. In another exemplary embodiment, the mapping table records mapped positions of all pixels. It should be noticed that since the position data D is obtained based on the second image data B, the image conversion processing unit 304 needs to perform one mapping for the position data D to obtain the mapped position data D that is based on the first image data A. Further, since resolution of the first image data A and the second image data B is known, the mapping can be performed according to a simple ratio rule. The predefined encryption rule may be mosaic (unclear but still can be recognized), random (cannot be recognized), and so on. According to the above process, a mapping table is generated. The mapping table records the mapped positions of pixels that are going to be encrypted. The image conversion processing unit 304 further generates a third image data F according to the mapping table. The image compression unit 305 is used for compressing the third image data F. The compressed third image data F is outputted by way of JPEG bit stream 32 manner. The memory unit 306 can be SRAM, DRAM, SDRAM, ROM, PROM, EPROM, OTPROM, EEPROM, Flash memory, and so on.

In an exemplary embodiment, the detection unit 303 further includes a position selection module 307 for visually selecting a plurality of positions by a user after the detection unit 303 detecting a plurality of position data. In particularly, the position selection module 307 may be a touch panel. The touch panel displays the second image data B and the plurality of position data D detected by the detection unit 303 simultaneously. If the user thinks that the plurality of position data D are not proper position data or are incorrect, he/she can directly select the positions (that is, pixels) that are going to be encrypted by operating on the touch panel. In this manner, the detected positions can be further adjusted.

Figure 4:
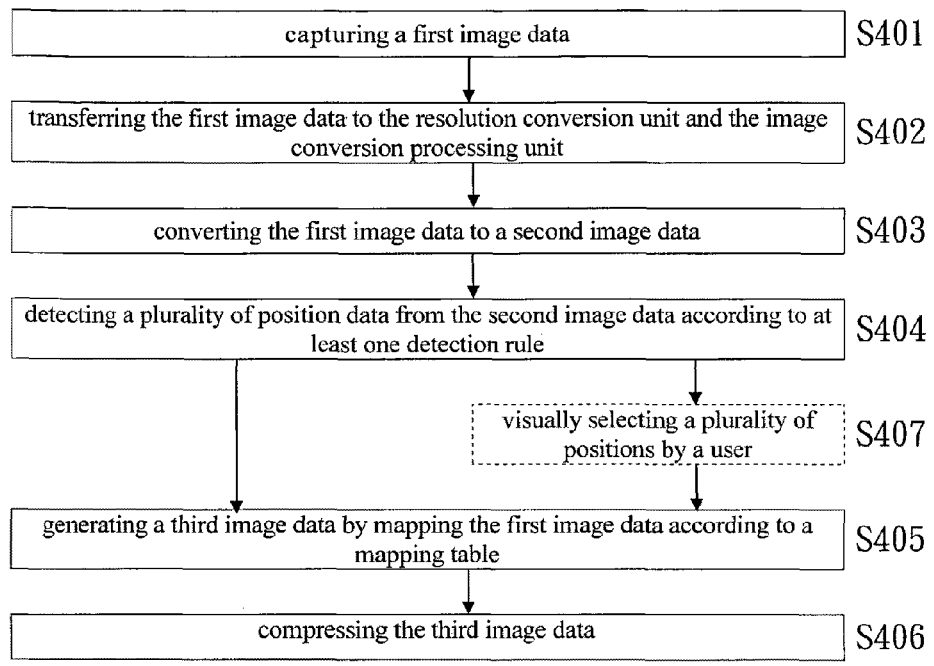
FIG. 4 shows a flow chart of the an image processing method of the image processing system according to a preferred embodiment of the present invention.

FIG. 4 shows a flow chart of an image processing method of the image processing system 30 according to a preferred embodiment of the present invention. In step S401, the image capturing unit 301 captures a first image data. In step S402, the first image data A is transferred to the resolution conversion unit 302 and the image conversion processing unit 304. In step S403, the resolution conversion unit 302 converts the first image data A into a second image data B. In another exemplary embodiment, resolution of the second image data B is less than resolution of the first image data A. In step S404, the detection unit 303 detects a plurality of position data from the second image data B according to at least one detection rule. In another exemplary embodiment, the detection rule is set in advance or is manually set by a user. The image conversion processing unit 304 generates a mapping table, according to the first image data A and the plurality of position data D, through a predefined encryption rule. The mapping table records the mapped positions of at least a portion of pixels. In another exemplary embodiment, the mapping table records mapped positions of all pixels. It should be noticed that since the position data D is obtained based on the second image data B, the image conversion processing unit 304 needs to perform one mapping for the position data D to obtain the mapped position data D that is based on the first image data A. Further, since resolution of the first image data A and the second image data B is known, the mapping can be performed according to a simple ratio rule. The predefined encryption rule may be mosaic (unclear but still can be recognized), random (cannot be recognized), and so on. According to the above process, a mapping table is generated. The mapping table records the mapped positions of pixels that are going to be encrypted. In step S405, the image conversion processing unit 304 generates a third image data F by mapping the first image data A according to the mapping table. In step S406, the image compression unit 305 compresses the third image data F. In an exemplary embodiment, the detection unit 303 further includes a position selection module 307, after the step of detecting a plurality of position data from the second image data according to at least one detection rule, the image processing method further includes the step of: visually selects a plurality of positions by a user. In particularly, the position selection module 307 may be a touch panel. The touch panel displays the second image data B and the plurality of position data D detected by the detection unit 303 simultaneously. If the user thinks that the plurality of position data D are not proper position data or are incorrect, he/she can directly select the positions (that is, pixels) that are going to be encrypted by operating on the touch panel. In this manner, the detected positions can be further adjusted.

Since only the sensitive portion (such as, human face, license plate, and so on) of the image is mapped (encrypted) through the mapping table, a user still can identify the image from other portions. Therefore, a more pragmatic application is provided. Further, a blur effect can be provided through a suitable mapping table. Moreover, since the encryption is performed in the image processing system 10 or 30, a real-time encryption is accomplished. Once the image is encrypted, only an administrator of the original device or other user with an authorization can decrypt it. Thus, the image data security is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system, comprising:
    an image capturing unit for capturing a first image data, the first image data having a plurality of pixels, each pixel corresponding to one position datum, and the plurality of pixels constituting a first position data;
    a resolution conversion unit for converting the first image data into a second image data;
    a detection unit for detecting the second image data according to at least one detection rule and generating a second position data, a plurality of detection rules being provided in the detection unit;
    an image conversion processing unit for converting the first image data into a third image data according to the first position data, the second position data and a mapping table, the mapping table recording the mapped positions of at least a portion of pixels;
    an image compression unit for compressing the third image data; and
    a memory unit for storing the first image data, the detection rule, the position data, the mapping table, and the third image data.

2. An image processing system according to claim 1, wherein the detection unit further comprises a position selection module for visually selecting a plurality of positions by a user after the detection unit detecting a plurality of position data.

3. An image processing system according to claim 1, wherein resolution of the second image data is less than resolution of the first image data.

4. An image processing system according to claim 1, wherein the mapping table records mapped positions of all pixels.

5. An image processing system according to claim 1, wherein the detection rule is set in advance or is manually set by a user.

6. An image processing system according to claim 1, wherein the image processing system further comprises a processing unit for generating the mapping table according to an encryption rule, the first position data and the second position data.

* * * * *